June 7, 1927.

J. M. SIMPSON 1,631,939

SPEED VARYING TRANSMISSION

Filed Oct. 28, 1925

INVENTOR.
John M. Simpson,
BY
Hood + Hahn
ATTORNEYS

June 7, 1927.
J. M. SIMPSON
1,631,939
SPEED VARYING TRANSMISSION
Filed Oct. 28, 1925
2 Sheets-Sheet 2
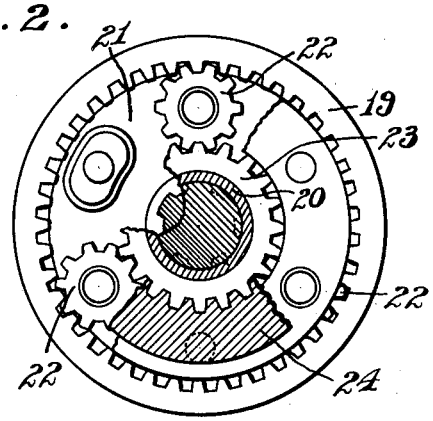
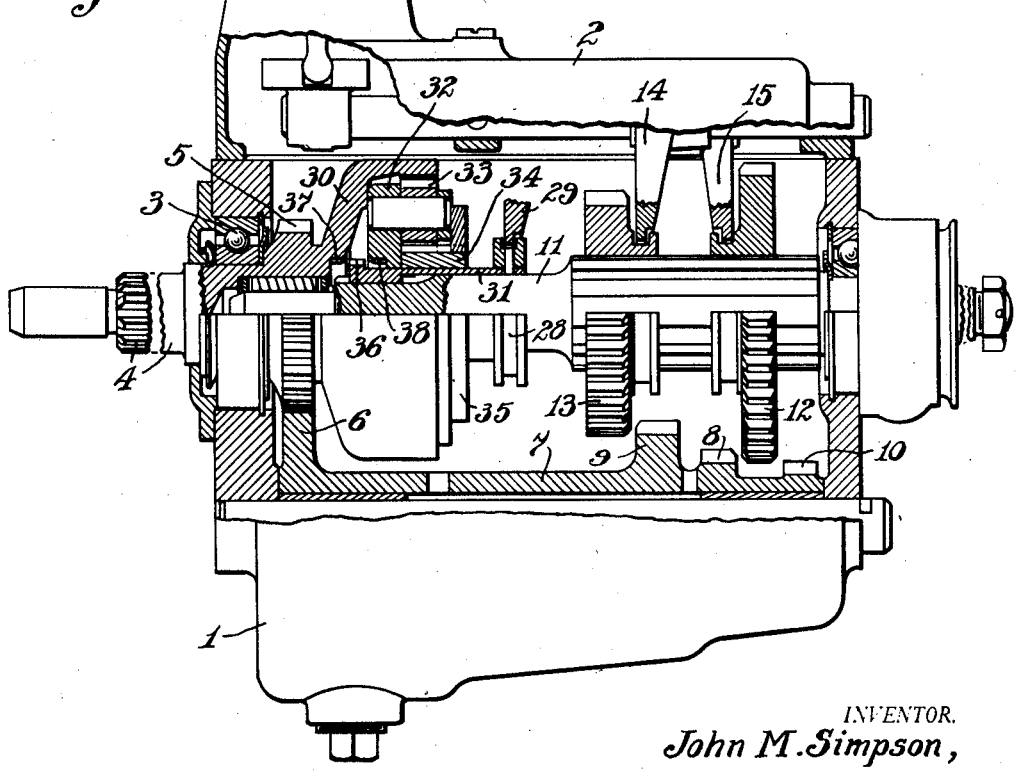
INVENTOR.
John M. Simpson,
BY
Hood + Hahn.
ATTORNEYS Patented June 7, 1927.

1,631,939

UNITED STATES PATENT OFFICE.

JOHN M. SIMPSON, OF MUNCIE, INDIANA, ASSIGNOR TO WARNER GEAR COMPANY, OF MUNCIE, INDIANA, A CORPORATION OF INDIANA.

SPEED-VARYING TRANSMISSION.

Application filed October 28, 1925. Serial No. 65,317.

My invention relates to improvements in speed changing transmission gearing particularly adaptable for automobile use.

In the standard type of automobile transmission now used there is usually provided a gearing having three speeds, namely, low, intermediate and high and a reverse drive. In certain types of cars, in addition to the above standard drive it is frequently desirable to provide a fourth speed which in some instances may be an overspeed by which the transmission shaft through a suitable gearing is driven at a speed greater than the speed of the engine shaft, and in other types of cars it is some time desirable to have a third speed which is lower than the direct drive speed.

It is one of the objects of my present invention to provide an additional gearing in the standard transmission gearing whereby such fourth speed may be obtained, the arrangement being such as to permit this fourth speed gearing to be easily and accurately manipulated and to be operated without objectionable gear noises.

For the purpose of disclosing my invention I have illustrated certain embodiments thereof in the accompanying drawings in which—

Fig. 2 is a transverse view on the line 2—2 of Fig. 1; and

Fig. 3 is an axial sectional view of another form of my transmission.

Figure 1:
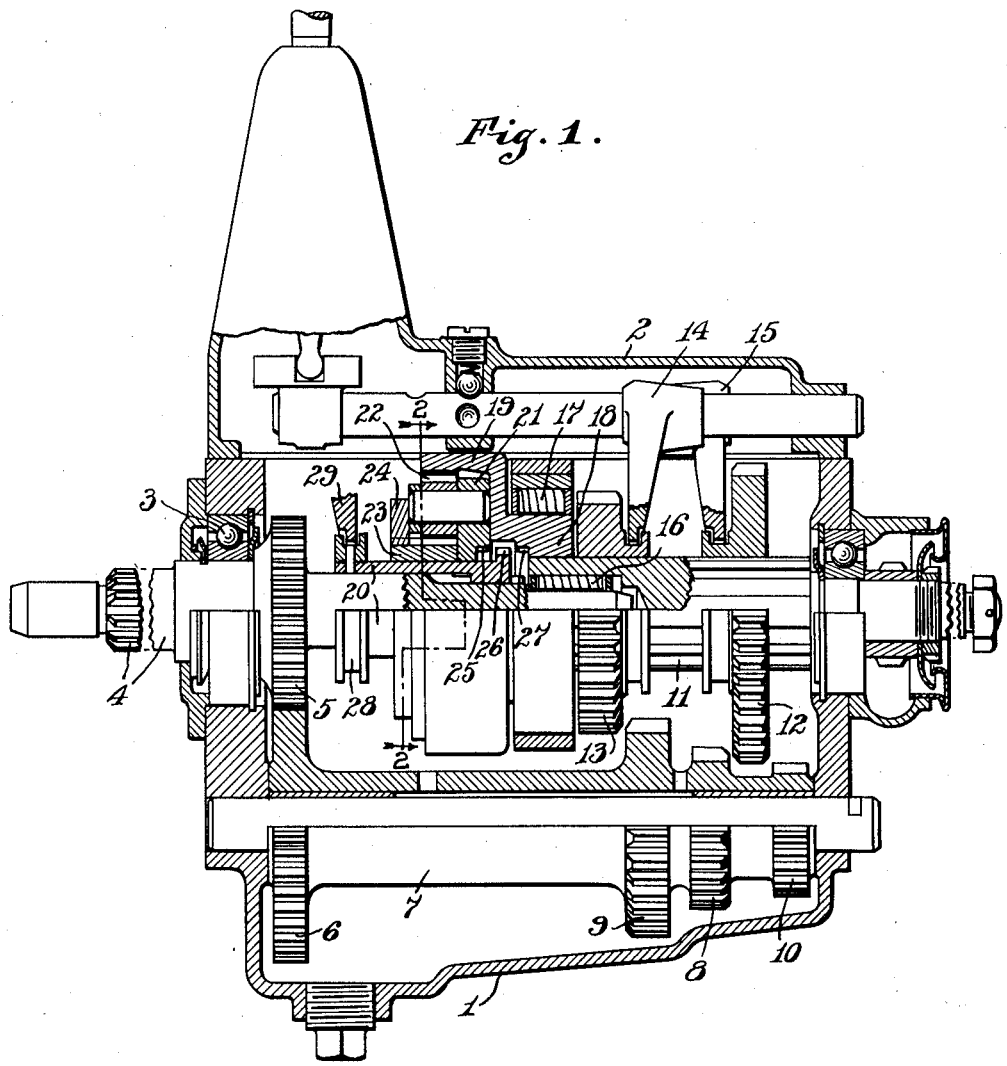
Fig. 1 is an axial section of a speed changing transmission embodying my invention.

In the embodiment illustrated, having reference first to the structure illustrated in Figs. 1 and 2, I provide a suitable enclosing casing 1 provided with a cover 2. Journaled in bearing 3 is a power receiving element or shaft 4 provided with a main spur gear 5 which meshes with a spur gear 6 of a counter-shaft 7 carrying a low speed gear 8 and an intermediate speed gear 9 and a reverse gear 10. Aligned with the shaft 4 is a power delivery shaft 11 upon which in the usual manner are splined gears 12 and 13. Gear 12 is capable of either meshing with gear 8 or with a pinion (not shown) which meshes with gear 10. Gear 13 is capable of meshing with the gear 9. The usual shifting forks 14 and 15 are provided for shifting the gears 12 and 13.

The inner end of the shaft 4 has a bearing in roller bearings 16 within the inner and adjacent end of the shaft 11. Concentric with the two shafts and supported in a bearing 17 is the hub 18 of an internal gear 19 which forms the external gear of a planetary gear train, the hub 18 being connected to rotate with the shaft 11. Splined on the shaft 4 and nesting within the gear 19 is a clutch shaft 20. Surrounding the clutch shaft to rotate thereon is a planetary gear carrier 21 which carries a suitable number of planetary gears 22 meshing with and lying between the gear 19 and a sun gear 23. The sun gear 23 surrounds the clutch shaft 20 and is held against rotation in a toothed opening in a locking plate 24 secured on the casing. The planetary gear carrier 21 is provided with a series of internal clutch teeth 25 adapted to receive the clutch teeth 26 of the sleeve 20, these teeth 26 being also receivable in clutch teeth 27 formed in the hub 18. The sleeve 20 is provided at its outer end with a fork groove 28 which receives a shifting fork 29.

In operation low speed is obtained in the usual manner by shifting gear 12 into engagement with gear 8; intermediate speed is obtained by shifting gear 13 into engagement with gear 9, and reverse is obtained by shifting gear 12 into engagement with the pinion meshing with gear 10 in the usual manner. During this driving period the teeth 26 are out of engagement with either the internal teeth 25 or 27. To obtain the direct drive speed teeth 26 are shifted into engagement with the internal teeth 27 on the hub 18 whereby the two shafts 4 and 11 are directly connected. To obtain the fourth gear speed, in this instance an overspeed, teeth 26 of the clutch 20 are shifted into engagement with the internal teeth 25 of the planetary gear carrier 21 so that this carrier will rotate with shaft 4 about the stationary sun gear 23 and impart high speed to the ring gear 19 of the planetary gear train, which in turn drives the shaft 11. In Fig. 3 I have illustrated a structure wherein, instead of obtaining an overspeed, an additional forward low speed is obtained. In this structure the internal ring gear 30 of the planetary gear train is mounted on shaft 4 while the clutch sleeve 31 is mounted on shaft 11 and the planetary gear carrier 32 surrounds the clutch sleeve 31 and carries pinions 33 adapted to mesh with the teeth of the gear 30 and with the teeth of the sun gear 34 held against rotation by the ring locking plate 35. The clutch shaft 31 is provided with teeth 36 arranged to mesh with teeth 37 of the ring gear 30 or with teeth 38 of the pinion carrier 32. The operation is the same as that of the structure illustrated in Figs. 1 and 2 with the exception that, due to the reversal of the parts, the speed of the shaft 11 is reduced instead of increased.

I claim as my invention:

1. A speed varying transmission comprising a power receiving shaft, a power delivery shaft aligned therewith, and a planetary gear train for connecting said shafts comprising an internal ring gear mounted on and rotatably connected with one of said shafts and having a set of clutch teeth, a stationary sun gear nesting said ring gear, a set of planetary pinions nesting said ring gear and meshing therewith and with said sun gear and mounted on a carrier having a set of clutch teeth and a clutch member splined on the other of said shafts and movable into engagement with the clutch teeth of the ring gear to directly connect said shafts and with the clutch teeth of the carrier to drive the delivery shaft through said planetary gear.

2. A speed varying transmission comprising a power receiving shaft and a power delivery shaft aligned therewith, and a planetary gear train for connecting said shafts comprising an internal ring gear mounted on and rotatably connected with one of said shafts, a stationary sun gear nesting said ring gear and a set of planetary pinions nesting said ring gear and meshing with said sun gear and ring gear and mounted on a carrier and having a set of clutch teeth and a clutch member splined on the other of said shafts and movable into engagement with clutch teeth drivingly connected with the shaft having the ring gear, to directly connect the shaft, and into engagement with the clutch teeth on said carrier to drive the delivery shaft through said gear train.

3. A speed varying transmission comprising a power receiving shaft, a power delivery shaft, and a planetary gear train comprising an internal ring gear mounted on and rotatable with one of said shafts and having internal clutch teeth in its hub, a clutch shaft surrounding the other of said shafts and splined thereon and provided with external clutch teeth, a planetary gear carrier rotatably mounted on said clutch shaft and having internal clutch teeth, a sun gear surrounding said clutch shaft and held against rotation, said carrier having planetary gear pinions mounted thereon and said sun gear nesting said internal ring gear and the teeth of said clutch shaft being slidable into engagement with the teeth in the hub of said ring gear to directly connect the shafts or into engagement with the internal clutch teeth of the carrier to drive the shafts through said planetary gear.

4. In a speed varying transmission comprising a power receiving shaft, a power delivery shaft and a planetary gear transmission comprising an internal gear mounted on and rotatably connected to one of said shafts, a stationary sun gear, a set of planetary pinions meshing with said ring and sun gears and mounted on a carrier rotatably mounted on said other shaft and a clutch member rotatably connected with said second mentioned shaft and arranged to make clutching engagement directly with the first mentioned shaft to directly connect the two shafts together or make clutching engagement with said carrier to connect said carrier with the second mentioned shaft and cause the delivery shaft to be driven through said gear train.

In witness whereof I, JOHN M. SIMPSON, have hereunto set my hand at Muncie, Indiana, this 24th day of October, A. D. one thousand nine hundred and twenty-five.

JOHN M. SIMPSON.